Figure 1:
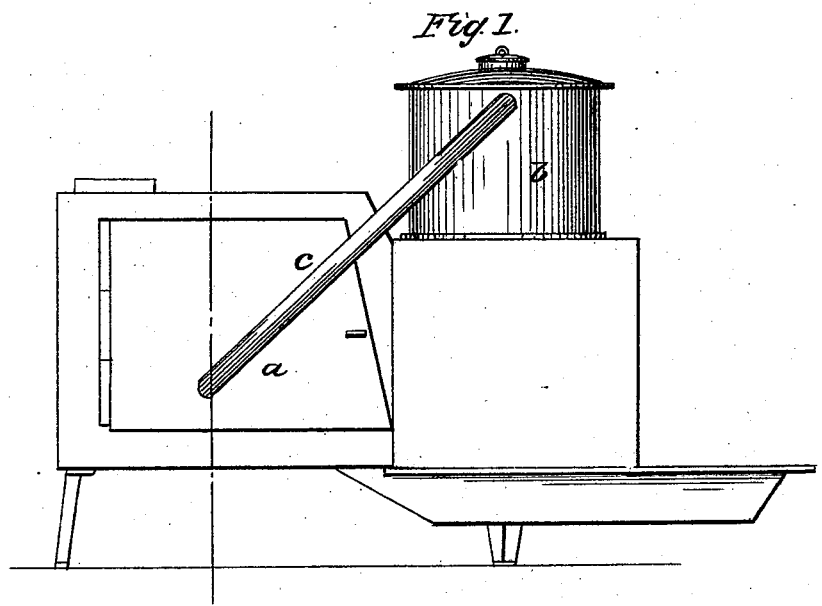
Figure 2:
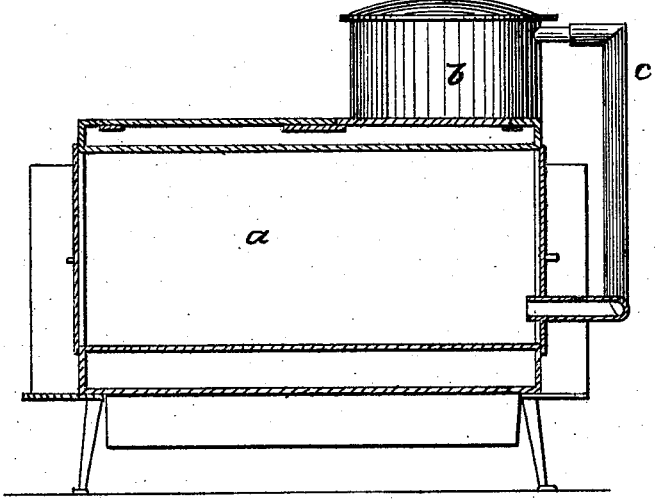

J. SHOPLAND.

Domestic Oven.

No. 15,495.

Patented Aug. 5, 1856.

UNITED STATES PATENT OFFICE.

JOHN SHOPLAND, OF HONESDALE, PENNSYLVANIA.

COMBINED STEAM AND HOT-AIR COOKING-STOVE.

Specification of Letters Patent No. 15,495, dated August 5, 1856.

*To all whom it may concern:*

Be it known that I, JOHN SHOPLAND, of Honesdale, in the county of Wayne and State of Pennsylvania, have invented a new and useful Improvement in Baking in the Ovens of Cooking-Stoves or Cooking-Ranges; and I do hereby declare that the following is a full and exact description thereof, reference being had to the accompanying drawings, making a part of this specification.

It is well known that articles baked in brick ovens, are more thoroughly baked and have a pleasanter and a more natural flavor than when they are baked in the ovens of cooking stoves, or cooking ranges. And I believe that this is caused by the unnatural dryness of the atmosphere in the ovens of the latter, which causes a crust to be too suddenly formed upon the surface of the articles baked in them, that prevents the escape of the gases from said articles and the free entrance of heat to the interior of the same, during the baking process. But by admitting hot steam into the ovens of cooking stoves, and the ovens of cooking ranges, I find that articles can be baked with as great perfection as in a brick oven; and my invention consists in the introduction of steam into ovens, whose sides are formed of metallic plates, and which are heated by the contact of fire heat with said plates. The said steam may be generated by means of a boiler $b$, placed upon the cooking stove, or range, and be conducted to the oven $a$, by means of a suitable conducting pipe $c$, as represented in the accompanying drawings.

Having thus fully described the nature of my invention, I would state that I am aware that a pan of water has been placed in an oven for moistening the air therein, and that steam has been introduced into a chamber for steaming meats and vegetables. These I do not claim. But

What I do claim as new and desire to secure by Letters Patent is—

The arrangement of a boiler outside, and independent of, the oven, so as to have the hot air, and steam at variable temperatures, and mix them at pleasure, or as the character of the cooking may require.

The above specification of my new and useful improvement in cooking stoves signed and witnessed this 27th day of April 1855.

JOHN SHOPLAND.

Witnesses:
 LELOTIS WM. AVERY,
 GILBERT KNAPP.